No. 625,769. Patented May 30, 1899.
W. HOLMES.
DEVICE FOR USE IN SECURING ELASTIC TIRES UPON VEHICLE WHEELS.
(Application filed Mar. 22, 1899.)
(No Model.) 2 Sheets—Sheet 1.

Witnesses:
A. F. Durand
Agnes A. Devine

Inventor:
William Holmes.
by Chas. L. Page Atty.

THE NORRIS PETERS CO., PHOTO-LITHO., WASHINGTON, D. C.

No. 625,769. Patented May 30, 1899.
W. HOLMES.
DEVICE FOR USE IN SECURING ELASTIC TIRES UPON VEHICLE WHEELS.
(Application filed Mar. 22, 1899.)
(No Model.) 2 Sheets—Sheet 2.
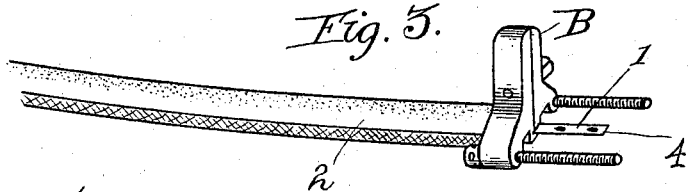
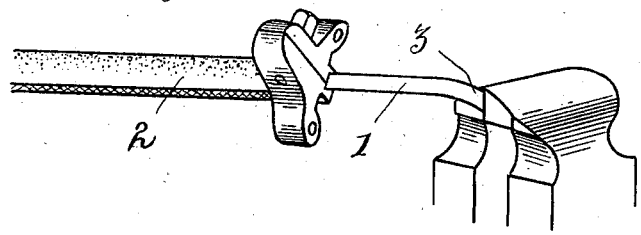
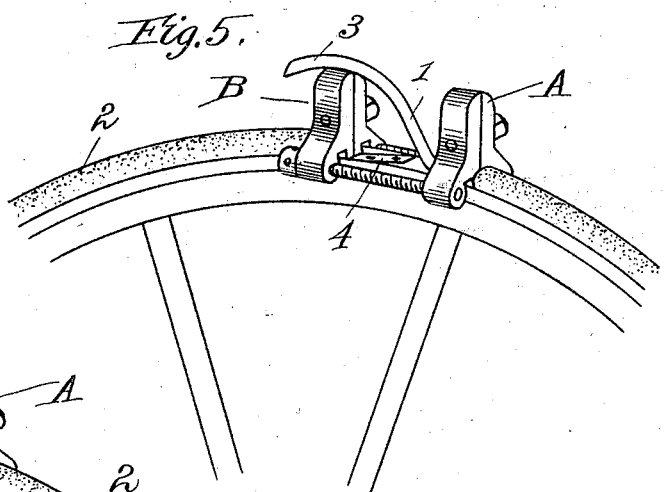
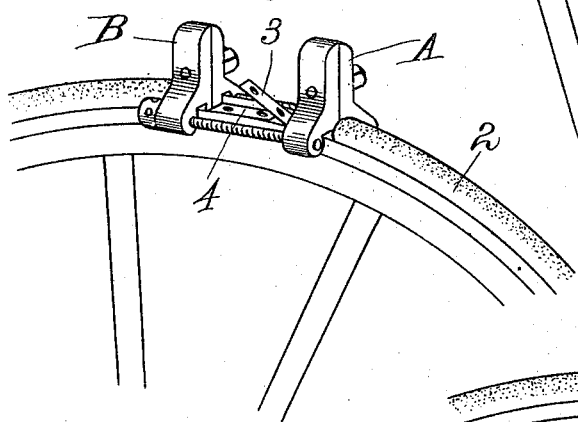
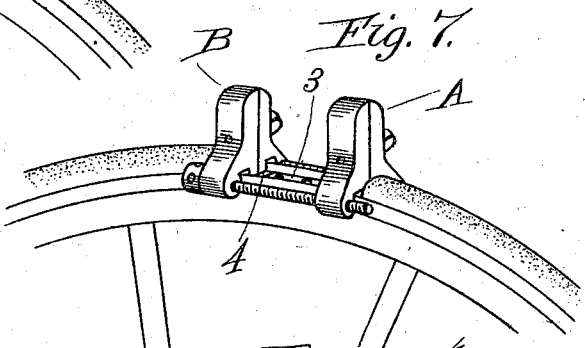
Witnesses:
A. F. Durand
Agnes A. Devine
Inventor:
William Holmes.
by Chas. L. Page Atty.

UNITED STATES PATENT OFFICE.

WILLIAM HOLMES, OF CHICAGO, ILLINOIS, ASSIGNOR TO THE MORGAN & WRIGHT, OF SAME PLACE.

DEVICE FOR USE IN SECURING ELASTIC TIRES UPON VEHICLE-WHEELS.

SPECIFICATION forming part of Letters Patent No. 625,769, dated May 30, 1899.

Application filed March 22, 1899. Serial No. 710,055. (No model.)

*To all whom it may concern:*

Be it known that I, WILLIAM HOLMES, a citizen of the United States, residing at Chicago, in the county of Cook and State of Illinois, have invented a certain new and useful Improvement in Devices for Use in Securing Elastic Tires upon Vehicle-Wheels, of which the following is a specification.

The object of my invention, generally stated, is to provide a simple, reliable, conveniently-operated, and efficient device for engaging and holding under tension the fastening-band of an elastic wheel-tire such as described in Letters Patent of the United States No. 604,067, dated May 17, 1898, while the tire is on the wheel-rim and during the operation of securing together the ends of such band.

To the attainment of the foregoing and other useful ends my invention consists in matters hereinafter set forth, and particularly pointed out in the claims.

Figure 1:
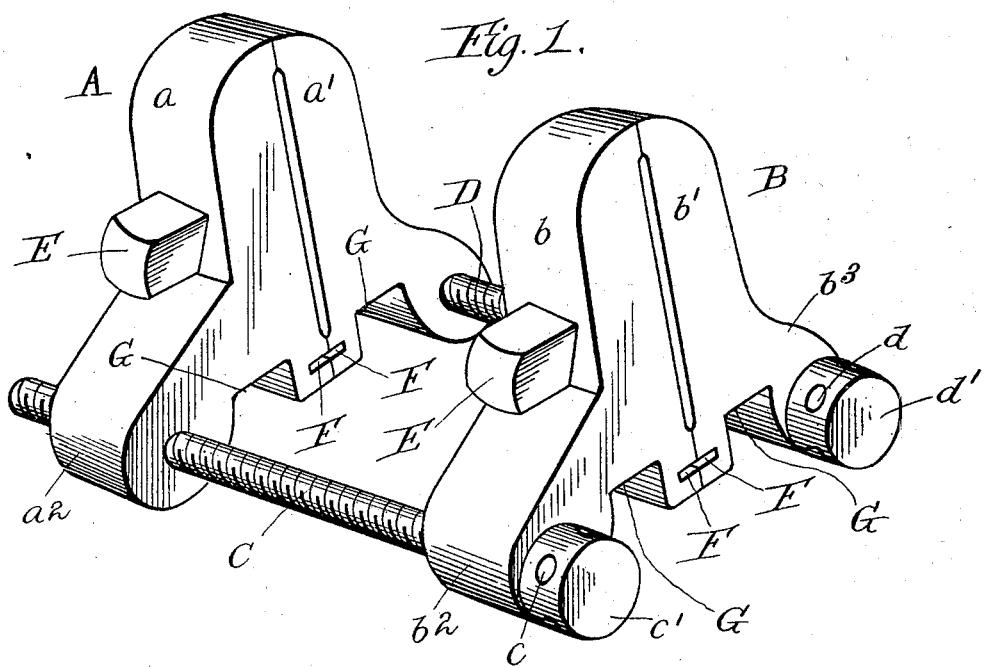
Figure 2:
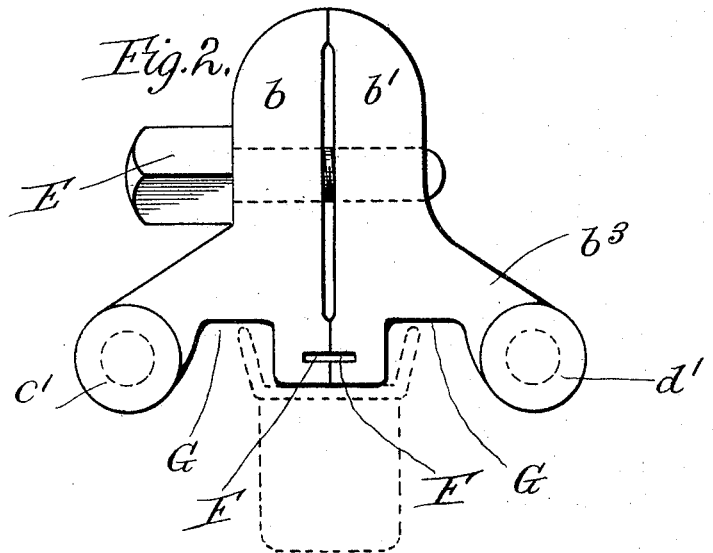

In the accompanying drawings, Figure 1 is a perspective of a clamping device constructed in accordance with my invention. Fig. 2 is an end view of the same. Figs. 3, 4, 5, 6, and 7 are perspective views illustrating the successive steps and manner in which my invention is employed in securing a rubber tire upon the rim of a vehicle-wheel.

The invention as illustrated comprises a pair of clamps A and B, connected for relative adjustment by tension-screws C and D, the said clamps consisting, respectively, of a couple of clamping jaws or members $a\,a'$ and $b\,b'$ and each pair of jaws being held together and operated by a clamping bolt or screw E. The tension or adjusting screws C and D extend, respectively, through lateral depending bearing portions $a^2$ and $b^2$ and $a^3$ and $b^3$ of the said clamps, and while the bearing portions $b^2$ and $b^3$ are preferably internally smooth to permit the tension-screws to rotate freely therein the bearing portions $a^2\,a^3$ are internally threaded with reference to the threaded portion of the said tension-screws. By this arrangement a relative adjustment of the two clamps may be secured by rotating the screws C and D, such rotation being accomplished by means of a short pin or rod inserted in any one of the holes $c$ or $d$, with which the heads $c'$ and $d'$ of the said screws are provided. The clamping-screw E in each case extends transversely through the body portion of the clamp, as shown in Fig. 2, the jaws $a'$ and $b'$ only being threaded, whereby the jaws of each clamp may be either brought together or separated by turning the said clamping-screws. Each clamp is adapted to grip an end portion of the retaining-band, and to such end the inner face of each clamping-jaw is provided with a groove F, which when the jaws are brought together coincide and serve to provide each clamp, in effect, with a slot, in which such end portion of the band will be held, it being observed that the band when thus held will be subject to an "edgewise" compression, so to speak, as the pressure brought to bear upon the said retaining-band will be upon the edges thereof rather than upon the flat surfaces. Thus constructed each clamp will be enabled to firmly grip an end portion of the band without liability of slip on the part of the latter, and by then turning the screws C and D so as to move the clamps toward each other the said retaining-band will be tightened or placed under tension and so held until the lapping end portions of the band are properly joined. Each clamping-jaw is preferably provided at its lower end with a notch G, whereby the clamps when in use may seat or rest upon the felly-rim, as shown in Fig. 2, and the screws C and D and the slots formed by the grooves F are preferably in line or in one and the same plane. Such arrangement is highly advantageous, as it brings the ends of the band down into place between the flanges of the felly-rim, and also for the reason that binding or cramping of the clamps upon the tension-screws is avoided, which latter would not be true if the tension-screws were arranged in a plane either above or below the grooves F.

The manner in which my device is employed consists in first removing the clamp A from the tension-screws and then gripping one end portion of the retaining-band 1 with clamp B, as illustrated by Fig. 3. The other end of the band is then placed in a vise and the rubber 2 compressed and held back the proper distance from such end by clamping or securing the clamp A upon the said band, as shown in Fig. 4. After this the straight length of tire, with a clamp at each end, is arranged about the circumference of the vehicle-wheel and the two clamps reconnected, as shown in Fig. 5, wherein it will be seen that the long end 3 of the band is allowed to rest or lie across the clamp B. The next step in the operation consists in cutting off or shortening up the end 3 and punching holes therein or otherwise adapting the thus-shortened end portion for joinment with the end 4 and then turning the tension-screws so as to place the band under tension or "draw it taut," so to speak. (See Fig. 6.) The ends of the band may then be riveted or otherwise secured together, as shown in Fig. 7, and the clamps then removed and the compressed rubber allowed to expand so as to cover the joint, it being observed at this juncture that the jaws of the clamp part or separate in such manner as to permit the device to be readily removed or lifted from the band and felly-rim without in any way dismembering or totally separating the various parts of the device.

From the foregoing it is now obvious that by my invention the operation of securing elastic tires upon vehicle-wheels is greatly facilitated, and also that such operation is rendered certain and positive. It is also obvious that by changing or altering the formation of the grooves F my device may be employed for putting on tires of various forms or, in other words, tires having a different form of retaining-band than the one herein illustrated.

What I claim as my invention is—

1. A device for use in securing elastic tires on vehicle-wheels, comprising oppositely-arranged clamps each involving a pair of separable jaws and an adjusting device for opening and closing the same, the jaws being adapted to receive and hold the ends of a retaining-band temporarily extending beyond the ends of the elastic tire, with each jaw of one pair of jaws adjustably connected by adjusting means with the corresponding jaw of the opposite pair of jaws, whereby the jaws of each pair can be relatively adjusted in directions lateral to an adjustment of one pair toward the opposite pair of jaws.

2. A device for use in securing elastic tires on vehicle-wheels, comprising oppositely-arranged clamps, each clamp consisting of a pair of separable jaws and a clamping bolt or screw for opening and closing the same, the portion of each clamp below the said bolt or screw being adapted to grip and hold the ends of a retaining-band temporarily extending beyond the ends of the elastic tire, and each jaw of one clamp being connected by a tension or adjusting screw with the corresponding jaw of the opposite clamp, whereby the two jaws of each clamp may be relatively adjusted in a direction at right angles to a relative adjustment of the two clamps.

3. A device for use in securing elastic tires upon vehicle-wheels, comprising a couple of clamps and one or more tension-screws directly connecting said clamps; each clamp involving a pair of separable jaws and an adjusting device for opening and closing the same, the jaws of each clamp being adapted to grip or hold the ends of a retaining-band in such manner as to compress the latter "edgewise," and the said tension screw or screws being arranged to give the clamps a relative adjustment for the purpose of tightening or placing the said band under tension.

4. A device for use in securing elastic tires upon vehicle-wheels, comprising a couple of clamps, and one or more tension-screws connecting said clamps; the clamps being adapted to grip respectively the opposite end portions of the retaining-band, and also adapted to seat upon the felly-rim so as to bring the ends of the band into position between the flanges of the said rim; and the said tension screw or screws being arranged to give the said clamps a relative adjustment for the purpose of tightening the said band.

5. A device for use in securing elastic tires upon vehicle-wheels, comprising a couple of clamps, and two or more tension-screws connecting said clamps; the clamps being adapted to grip respectively the opposite ends of the retaining-band, and also adapted to seat within the felly-rim so as to bring the end portions of the band into position between the flanges of the said rim; and the said tension-screws being arranged to occupy positions respectively at either side of the felly-rim and in the same plane as the said band, and adapted to give the said clamps a relative adjustment for the purpose of tightening the retaining-band.

6. A device for use in securing elastic tires upon vehicle-wheels, comprising a couple of clamps, and two or more tension-screws connecting the said clamps; each clamp consisting of a pair of clamping-jaws connected by one or more clamping bolts or screws, and each of said jaws being grooved to enable the said clamps to grip respectively the opposite end portions of the retaining-band; the said band when thus gripped being subject to an "edgewise" compression, and the said jaws being also provided with notches which permit the clamps to seat within the felly-rim and thereby bring the end portions of the band into position between the flanges of the said felly-rim; and the said tension-screws being arranged to occupy positions respectively at either side of the felly-rim, and adapted to give the clamp a relative adjustment for the purpose of tightening the retaining-band.

7. A device for use in securing elastic tires upon vehicle-wheels, comprising a couple of clamps, and a couple of tension-screws connecting the said clamps; each clamp consisting of two clamping-jaws connected by a clamping bolt or screw, and each of said jaws being grooved to enable the said clamps to grip respectively the opposite end portions of the retaining-band, the said band when thus gripped being subject to an "edgewise" compression; the said jaws being also provided with depending bearing portions through which the said tension-screws extend, and with notches which permit the clamps to seat within the felly-rim so as to bring the end portions of the band into position between the flanges of the said rim; and the said tension-screws being arranged to occupy positions respectively at opposite sides of the felly-rim, and in the same plane as the grooves in the clamping-jaws.

8. A device for use in securing tires upon vehicle-wheels, comprising a couple of clamps A and B, and a couple of tension-screws C and D connecting the said clamps; each clamp consisting of a pair of clamping-jaws connected by a clamping-screw, and each jaw being provided with a notch G, a groove F, and a depending bearing portion through which a tension-screw extends, substantially as shown and described.

9. A device for use in securing elastic tires upon vehicle-wheels, comprising a couple of clamps adapted to grip the opposite ends of the retaining-band, and a couple of tension-screws connecting said clamps; the said tension-screws being arranged to occupy positions respectively at opposite sides of the felly-rim, and in the same plane as the retaining-band; each clamp consisting of a couple of clamping-jaws connected by a clamping-screw, the said clamping-screws extending through the clamps transversely to the length of the tension-screws, but in a plane parallel with the plane occupied by the said tension-screws and retaining-band; and the said tension-screws being adapted to give the clamps a relative adjustment, whereby the retaining-band may be tightened or placed under tension, preparatory to lapping and joining the ends of the said band.

WILLIAM HOLMES.

Witnesses:
ARTHUR F. DURAND,
AGNES A. DEVINE.